(12) United States Patent
Kruglick

(10) Patent No.: US 8,887,073 B2
(45) Date of Patent: Nov. 11, 2014

(54) RESHAPING INTERFACES USING CONTENT-PRESERVING WARPS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 297 days.

(21) Appl. No.: 13/059,826

(22) PCT Filed: Dec. 1, 2010

(86) PCT No.: PCT/US2010/058503
§ 371 (c)(1),
(2), (4) Date: Feb. 18, 2011

(87) PCT Pub. No.: WO2012/074521
PCT Pub. Date: Jun. 7, 2012

(65) Prior Publication Data
US 2012/0144324 A1    Jun. 7, 2012

(51) Int. Cl.
*G06F 3/00* (2006.01)

(52) U.S. Cl.
USPC ............ 715/762; 715/763; 715/765; 715/801

(58) Field of Classification Search
None
See application file for complete search history.

(56) References Cited

U.S. PATENT DOCUMENTS

| | | | |
|---|---|---|---|
| 6,504,541 B1 | 1/2003 | Liu et al. | |
| 7,064,772 B1 | 6/2006 | Thompson et al. | |
| 7,583,276 B1 * | 9/2009 | Worthington | 345/647 |
| 8,218,895 B1 * | 7/2012 | Gleicher et al. | 382/275 |
| 8,225,198 B2 * | 7/2012 | Hanechak | 715/243 |
| 2003/0107591 A1 | 6/2003 | Jameson | |
| 2003/0179237 A1 * | 9/2003 | Nelson et al. | 345/765 |
| 2005/0251757 A1 * | 11/2005 | Farn | 715/810 |
| 2008/0295005 A1 * | 11/2008 | Salesin et al. | 715/763 |
| 2009/0327925 A1 * | 12/2009 | Smet | 715/762 |

OTHER PUBLICATIONS

Beier, T. et al., "Feature-based image metamorphosis," Computer Graphics 26, No. 2, pp. 35-42, 1991.
Heckbert, P. S., "Fundamentals of texture mapping and image warping," University of California at Berkeley, Berkeley, CA, 1989.
Wang, Y. S. et al., "Optimized scale-and-stretch for image resizing," ACM Trans. Graph 27, No. 5, p. 118, 2008.
Liu, F. et al., "Content-Preserving Warps for 3D Video Stabilization," ACM Transactions on Graphics (Proceedings of SIGGRAPH 2009), 2009.
Wolf, L. et al., "Non-homogeneous content-driven video-retargeting," in Proceedings of the Eleventh IEEE International Conference on Computer Vision (ICCV-07), 2007.
S. Avidan and A. Shamir, "Seam carving for content-aware image resizing," ACM Transactions on Graphics 26, No. 3, p. 10, 2007.

(Continued)

*Primary Examiner* — Anil N Kumar
(74) *Attorney, Agent, or Firm* — Moritt Hock & Hamroff LLP; Steven S. Rubin, Esq.

(57) ABSTRACT

Technologies are generally described herein for reshaping a graphical user interface. The graphical user interface may include one or more content elements. An interface design tool may enable users to define one or more borders with respect to the graphical user interface. The interface design tool may also perform a content-preserving warp on the graphical user interface. When the interface design tool performs the content-preserving warp, the interface design tool may preserve a shape and dimensions of any content elements defined by the borders.

22 Claims, 7 Drawing Sheets

(56) References Cited

OTHER PUBLICATIONS

Francisco-Revilla, L. et al., "WARP: a web-based dynamic spatial hypertext," in Proceedings of the fifteenth ACM conference on Hypertext and hypermedia (ACM, 2004), 235-236.

"Java Advanced Imaging API Summary," Appendix B, Copyright © 1999, Sun Microsystems, Inc., pp. 23, accessed on http://java.sun.com/products/java-media/jai/forDevelopers/jai1_0_1guide-unc/API-summary.doc.html, Last accessed at Apr. 17, 2012.

International Search Report dated Jan. 21, 2011 in International Serial No. PCT/US10/58503.

* cited by examiner

RESHAPING INTERFACES USING CONTENT-PRESERVING WARPS

BACKGROUND

Unless otherwise indicated herein, the materials described in this section are not prior art to the claims in this application and are not admitted to be prior art by inclusion in this section.

Various technologies can visually modify an existing graphical user interface ("GUI"). For example, some conventional technologies can increase pixel size of the GUI and/or increase the size of interface areas (e.g., a news feed window, a text box, etc.) in the GUI. Such applications can be utilized to implement GUIs designed for devices having smaller displays (e.g., a smartphone) or on devices having larger displays (e.g., a tablet computer). However, these conventional technologies may lack functionality for reshaping the GUI.

SUMMARY

The present disclosure generally describes some methods for reshaping a graphical user interface. One or more operations in the methods may be executed through a computer having a processor and a memory. According to some example methods, the computer may receive an input of one or more content elements within the graphical interface. The computer may also receive a border corresponding to a first content element in the content elements. Upon receiving the border, the computer may perform a content-preserving warp on the graphical user interface such that a shape and dimensions of the first content element corresponding to the border are preserved.

The present disclosure generally describes some computer systems. Some example computer systems may be configured to include a processor, a memory coupled to the processor, and a design tool. The design tool may be adapted to execute in the processor from the memory and, when executed by the processor, cause the computer system to reshape a graphical user interface by performing one or more of the following operations. The computer system may receive one or more content elements within the graphical user interface. The content elements may include a first content element, a second content element, and a third content element. The computer system may also receive a border corresponding to the first content element. The computer system may further receive a keyline separating a first area of the graphical user interface containing the second content element and a second area of the graphical user interface containing the third content element. Upon receiving the border and the keyline, the computer system may perform a content-preserving warp on the graphical user interface. During the content-preserving warp, the computer system may preserve a shape and dimensions of the first content element corresponding to the border, as well as scales of the first area and the second area. Further, the computer system may adjust shapes of the second content element and the third content element within the first area and the second area, respectively, according to the content-preserving warp.

The present disclosure generally describes some computer storage media. Some example computer storage media may include computer-executable instructions stored thereon for some methods which, when executed by a computer, adapt the computer reshape a graphical user interface. According to some example methods, the computer may be configured to perform one or more of the following operations. The computer may receive one or more content elements within the graphical user interface. The content elements may include a first content element, a second content element, and a third content element. The computer may also receive a border corresponding to the first content element. The computer may further receive a keyline separating a first area of the graphical user interface containing the second content element and a second area of the graphical user interface containing the third content element. Upon receiving the border and the keyline, the computer may perform a content-preserving warp on the graphical user interface to conform the graphical user interface to a non-rectangular surface. During the content-preserving warp, the computer may preserve a shape and dimensions of the first content element corresponding to the border, as well as scales of the first area and the second area. The computer may adjust shapes of the second content element and the third content element within the first area and the second area, respectively, according to the content-preserving warp.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
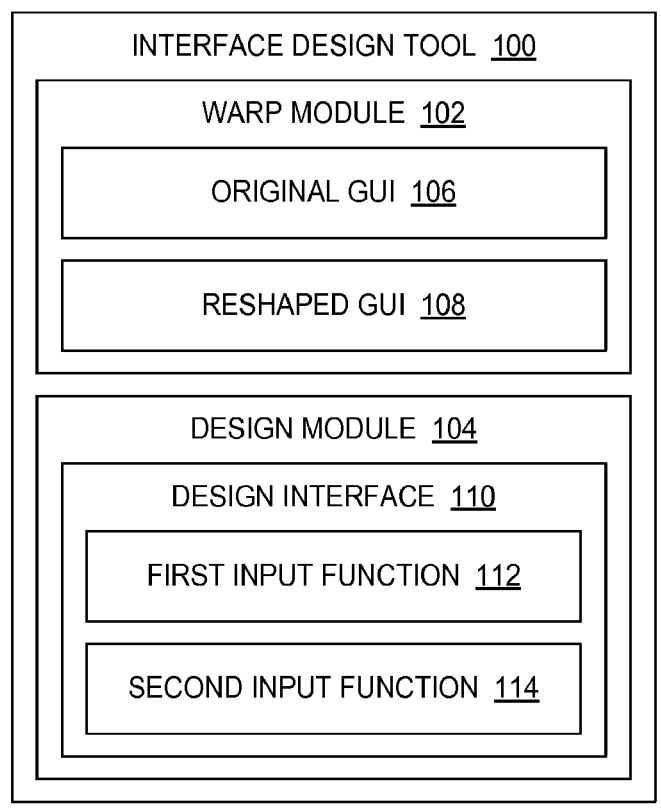
FIG. 1 is a functional block diagram illustrating an example interface design tool adapted to reshape a graphical user interface.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to an interface design tool configured to reshape a GUI by utilizing a content-preserving warp. The reshaped GUI may be utilized in various applications where alternative visual configurations of the GUI are desirable. For example, in augmented reality applications, a GUI may be reshaped for projection on a non-rectangular surface such that a projection of the reshaped GUI on the non-rectangular surface maintains a similar "look and feel" to a projection of the original GUI on a rectangular surface.

An interface designer may desire to preserve various portions of a GUI during the content-preserving warp. For example, the interface designer may want to preserve the shapes of trademarks and interface controls displayed in the GUI. In this regard, the interface design tool may provide functionality whereby the interface designer can define one or more borders around one or more content elements in the GUI prior to initiating the content-preserving warp. When the interface design tool performs the content-preserving warp, the interface design tool may preserve the shape and dimensions of the content elements within the defined borders, while reshaping and/or resizing other content elements that are not within the defined borders.

The interface design tool may also provide functionality whereby the interface designer can define one or more keylines delineating various areas within the GUI prior to initiating the content-preserving warp. For example, the keylines may delineate a first area containing a first content element from a second area containing a second content element. When the interface design tool performs the content-preserving warp, the interface design tool may preserve scales of the first area and the second area. The interface design tool may further reshape and/or resize the first content element within the first area and the second content element within the second area, as the interface design tool also reshapes and/or resizes the first area and the second area.

Turning now to FIG. 1, a functional block diagram illustrates an example interface design tool 100 adapted to reshape a graphical user interface, in accordance with at least some embodiments presented herein. The interface design tool 100 may include a warp module 102 and a design module 104. The warp module 102 may be adapted to perform a content-preserving warp on an original GUI 106, thereby transforming the original GUI 106 into a reshaped GUI 108.

In various embodiments, a content-preserving warp may refer to a morph or warp performed with a constraint of minimizing total visual deformation by maintaining local similarity of keypoint connections. A content-preserving warp may provide rigid transformations at borders and similar warps around the areas between keylines, where the keylines can represent boundaries that can be rigid or similar to middling degrees. The keylines may provide salience measures. The keylines may also be utilized as energy boundaries along which distortion energies can be minimized in order to maintain "look and feel." It should be appreciated that content-preserving warps are generally known. As such, content-preserving warps are not described in further detail here. For example, some background on content-preserving warps is described in "Liu et al., Content-Preserving Warps for 3D Video Stabilization", ACM Transactions on Graphics (Proceedings of SIGGRAPH 2009).

The design module 104 may include a design interface 110. The design interface 110 may be configured to display the original GUI 106 and to offer various functions enabling its user, such as, by way of example only, an interface designer to define borders and/or keylines with respect to the original GUI 106. In particular, the design interface 110 may include a first input function 112 and a second input function 114.

Through the first input function 112, the interface designer may define one or more borders around one or more content elements in the original GUI 106. As used herein, a "content element" may refer to any suitable visual element within the original GUI 106. The content elements may be represented as text, hyperlinks, images, video, various other graphical elements, or combinations thereof. Some examples of content elements may include windows, menus, icons, and interface controls (e.g., buttons).

In some embodiments, the first input function 112 may include drawing functionality whereby the interface designer can draw or otherwise manually mark a continuous line along an outer edge of a content element. The continuous line may define a border. The interface designer may manually mark the border utilizing a mouse, touchscreen, or other suitable input device. In some other embodiments, the first input function 112 may include coordinate input functionality whereby the interface designer can input one or more coordinates along an outer edge of a content element and provide an indication that the coordinates form a complete geometry of a border. Upon receiving the coordinates and the indication, the first input function 112 can then mark the border along the outer edge of the content element corresponding to the received coordinates.

In yet some other embodiments, the interface elements may be drawn or invoked from a library of interface elements that have predefined borders. Other suitable techniques for identifying outer edges of content elements in the original GUI 106 may be similarly implemented. When the warp module 102 performs the content-preserving warp on the original GUI 106, the warp module 102 may preserve the shape and dimensions of the content elements within the defined borders, while reshaping and/or resizing other content elements that are not within the defined borders.

Through the second input function 114, the interface designer may define one or more keylines delineating multiple areas within the original GUI 106. Each area specified by the keylines may include one or more content elements. In some embodiments, the second input function 114 may include drawing functionality whereby the interface designer may manually define a keyline by marking a line within the original GUI 106. Other suitable techniques for delineating multiple areas within the original GUI 106 may be similarly implemented.

In an illustrative example, a keyline may delineate a first area and a second area in the original GUI 106. The first area may include a first content element, and the second area may include a second content element. When the warp module 102 performs the content-preserving warp, the warp module 102 may preserve scales of the first area and the second area or otherwise warp the areas in a way that numerically minimizes the distortion of the keylines. The warp module 102 may further reshape and/or resize the first content element within the first area and the second content element within the second area, as the warp module 102 also reshapes and/or resizes the first area and the second area.

In some embodiments, while the borders and/or the keylines may be visible on the original GUI 106 and/or the reshaped GUI 108 via the design interface 110, the borders and/or keylines may not be visible to end users who may view the original GUI 106 and/or the reshaped GUI 108 apart from the interface design tool 100. That is, the borders and/or the keylines may be markings visible only for interface designers utilizing the interface design tool 100.

Figure 2A:
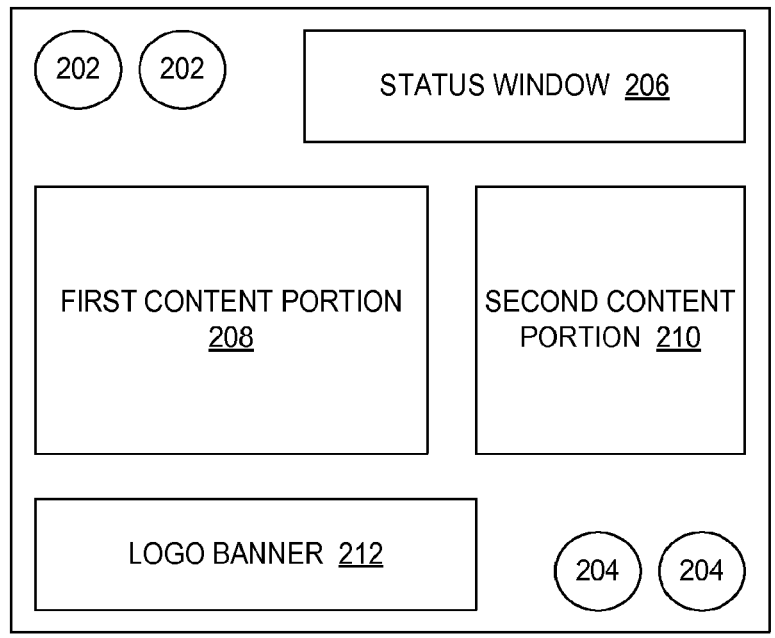
FIG. 2A is a screen display diagram illustrating an example implementation of an original GUI.

Turning now to FIG. 2A, a screen display diagram illustrates an example implementation of the original GUI 106, in accordance with at least some embodiments presented herein. The original GUI 106 may include one or more content elements, such as a first set of buttons 202, a second set of buttons 204, a status window 206, a first content portion 208, a second content portion 210, and a logo banner 212. The first content portion 208 and the second content portion 210 may include various visual media, such as text, hyperlinks, images, video, various other graphical elements, or combinations thereof. The first set of buttons 202, the second set of buttons 204, the status window 206, the first content portion 208, the second content portion 210, and the logo banner 212 may be collectively referred to as content elements 202-212.

Figure 2B:
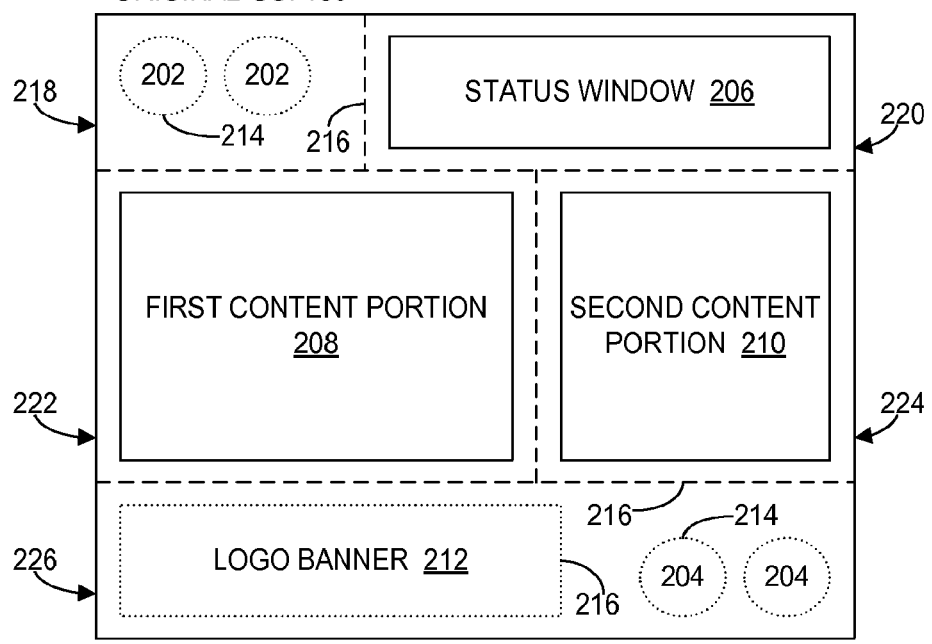
FIG. 2B is a screen display diagram illustrating an example implementation of the original GUI after borders and keylines are added via the design interface.

Turning now to FIG. 2B, a screen display diagram illustrates an example implementation of the original GUI 106 after borders 214 and keylines 216 are added via the design interface 110, in accordance with at least some embodiments presented herein. Through the first input function 112 and the second input function 114, an interface designer can define borders 214 and keylines 216 with respect to the original GUI 106. In the example illustrated in FIG. 2B, the borders 214 are indicated by dotted lines along outer edges of the first set of buttons 202, the second set of buttons 204, and the logo banner 212.

Further, in the example illustrated in FIG. 2B, the keylines 216 are indicated by dashed lines, which delineate a first area 218, a second area 220, a third area 222, a fourth area 224, and a fifth area 226. The first area 218 may include the first set of buttons 202. The second area 220 may include the status window 206. The third area 222 may include the first content portion 208. The fourth area 224 may include the second content portion 210. The fifth area 226 may include the logo banner 212 and the second set of buttons 204.

Figure 3A:
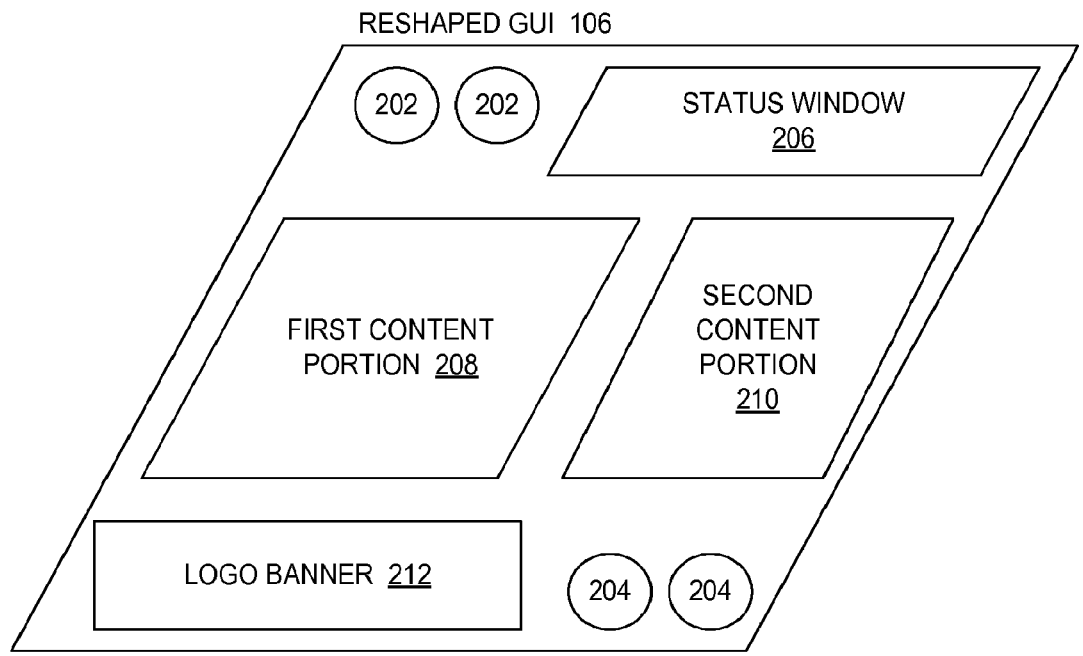
FIGS. 3A-3C are screen display diagrams illustrating various example implementations of a reshaped GUI.
Figure 3B:
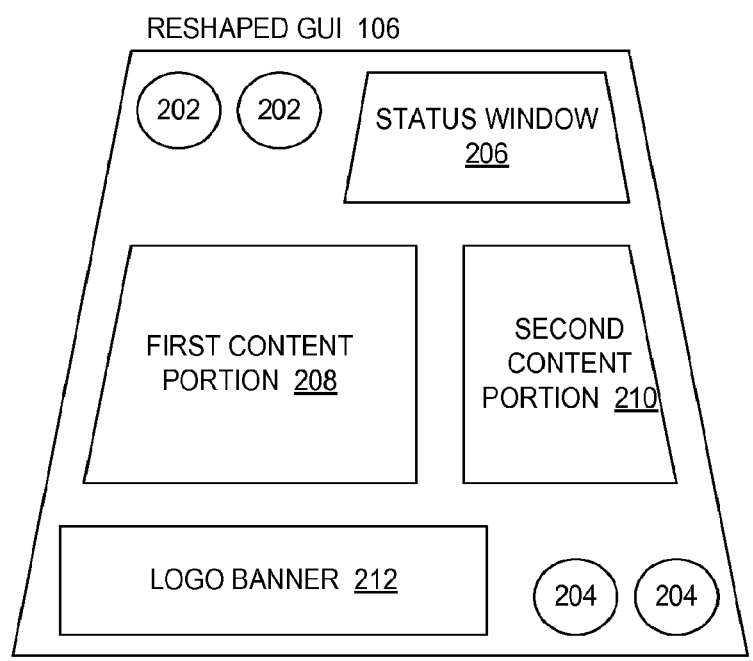
Figure 3C:
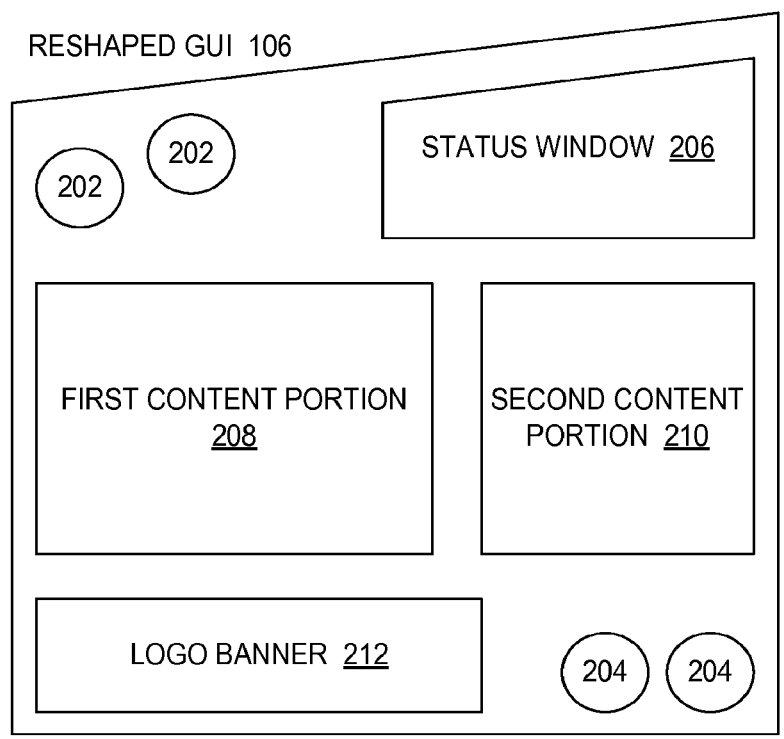

Turning now to FIGS. 3A, 3B, and 3C, screen display diagrams illustrate first, second, and third example implementations, respectively, of the reshaped GUI 108, in accordance with at least some embodiments presented herein. During the transformation from the original GUI 106 to the reshaped GUI 108, the shapes and dimensions of the first set of buttons 202, the second set of buttons 204, and the logo banner 212 may be preserved in accordance with the borders 214. The scales of the status window 206, the first content portion 208, and the second content portion 210 may be preserved in accordance with the keylines 216. That is, the aspect ratios between the status window 206, the first content portion 208, and the second content portion 210 may remain the same or substantially the same. The warp may be performed so as to match the outer border to a new shape while minimizing the numeric distortion of the keylines. Further, the status window 206, the first content portion 208, and the second content portion 210 may be reshaped and/or resized within the second area 220, the third area 222, and the fourth area 224, respectively, also in accordance with the keylines 216. It should be appreciated that FIGS. 3A, 3B, and 3C may not be drawn to scale with respect to FIG. 2A.

Figure 4:
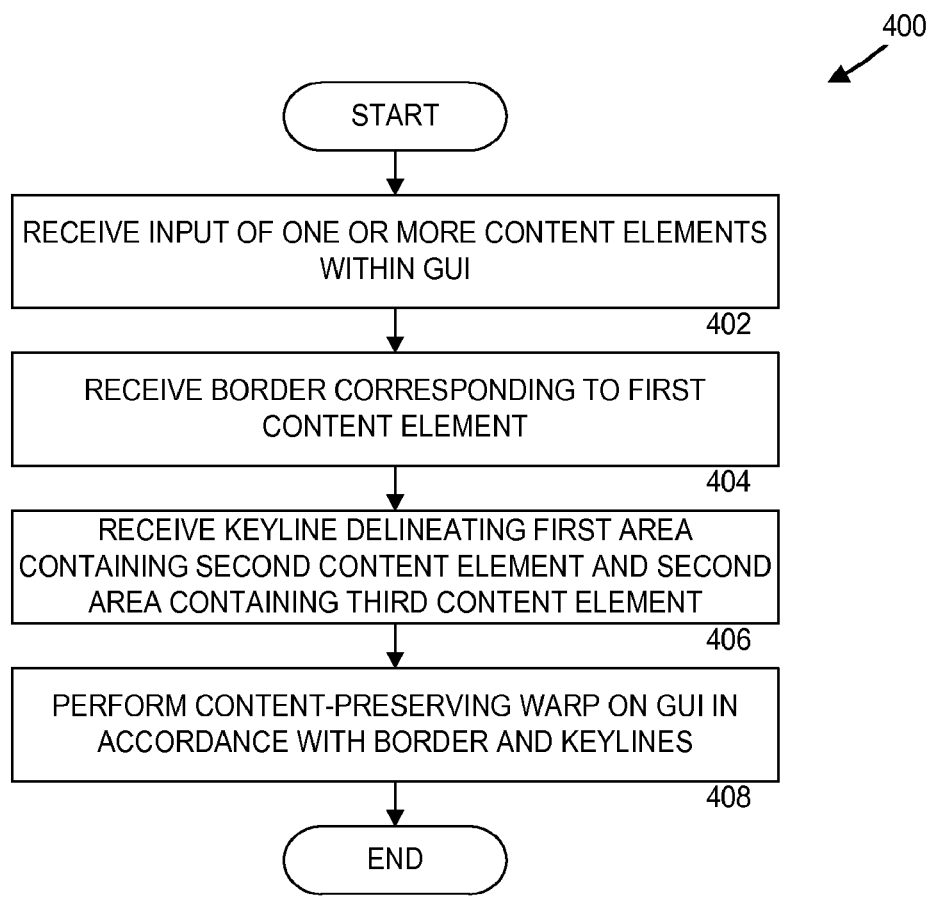
FIG. 4 is a flow diagram illustrating an example process for reshaping a graphical user interface.

Turning now to FIG. 4, a flow diagram illustrates an example process 400 for reshaping a graphical user interface, in accordance with at least some embodiments described herein. The process 400 may include various operations, functions, or actions as illustrated by one or more of blocks 402-408. The process 400 may begin at block 402 (Receive Input of One or More Content Elements within GUI), where the interface design tool 100 may be configured to receive one or more content elements with an original GUI. For example, the interface design tool 100 may receive the content elements 202-212 within the original GUI 106. In some embodiments, the design interface 110 may offer multiple unselected content elements. The interface designer may then create a GUI by selecting the content elements from the multiple unselected content elements. In an illustrative example, the content elements may include a first content element, a second content element, a third content element, and other content elements. Block 402 may be followed by block 404.

At block 404 (Receive Border Corresponding to First Content Element), the interface design tool 100 may be configured to receive one or more borders corresponding to one or more of the content elements. In particular, the design module 104 may effectuate the defining of the borders. Continuing the illustrative example, the interface design tool 100 may receive, via the design interface 110, a border corresponding to the first content element in the GUI. The design interface 110 may include the first input function 112 enabling the interface designer to define the border. In some embodiments, the first input function 112 may include drawing functionality whereby the interface designer can draw or otherwise manually mark a continuous line along an outer edge of the first content element. The continuous line may define the border.

In some other embodiments, the first input function 112 may include a coordinate input functionality whereby the interface designer can input one or more coordinates along an outer edge of the first content element and provide an indication that the coordinates form a complete geometry of a border. Upon receiving the coordinates and the indication, the first input function 112 can then mark the border along the outer edge of the first content element corresponding to the received coordinates. Other suitable techniques for identifying outer edges of content elements in the original GUI 106 may be similarly implemented. Block 404 may be followed by block 406.

At block 406 (Receive Keyline Delineating First Area Containing Second Content Element and Second Area Containing Third Content Element), the interface design tool 100 may be configured to receive one or more keylines delineating one or more areas within the GUI. In particular, the design module 104 may effectuate the defining of the keylines. Continuing the illustrative example, the interface design tool 100 may receive, via the design interface 110, a keyline delineating a first area containing the second content element and a second area containing the third content element. The design interface 110 may include the second input function 114 enabling the interface designer to define the keyline. In some embodiments, the second input function 114 may include drawing functionality whereby the interface designer may manually define a keyline by marking a line within the original GUI. Other suitable techniques for delineating multiple areas within the original GUI may be similarly implemented. Block 406 may be followed by block 408.

At block 408 (Perform Content-Preserving Warp on GUI in Accordance with Border and Keylines), the interface design tool 100 may be configured to perform, via the warp module 102, a content-preserving warp on the original GUI, thereby transforming the original GUI to a reshaped GUI, such as the reshaped GUI 108. When the warp module 102 performs the content-preserving warp on the original GUI, the warp module 102 may preserve the shape and dimensions of the content elements within the defined borders, while reshaping and/or resizing other content elements that are not within the defined borders. Continuing the illustrative example, the warp module 102 may preserve the size and dimensions of at least the first content element, and reshape and/or resize the other content elements.

When the warp module 102 performs the content-preserving warp on the original GUI, the warp module 102 may also preserve scales of the first area and the second area. The warp module 102 may further reshape and/or resize the second content element within the first area and the third content element within the second area, as the warp module 102 also reshapes and/or resizes the first area and the second area. After block 408, the process 400 may either repeat (e.g., periodically, continuously, or on demand as needed) or terminate.

Figure 5:
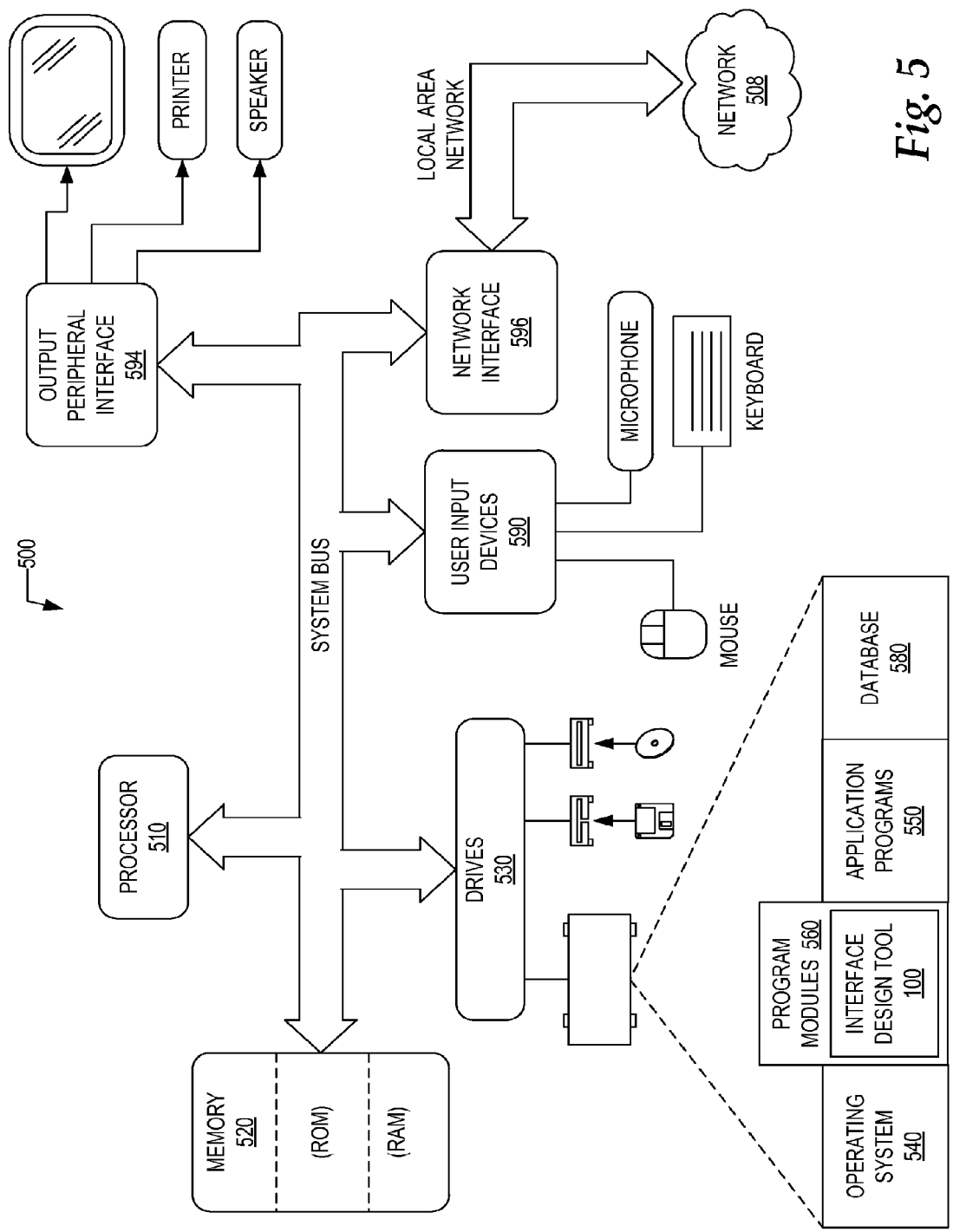
FIG. 5 is a block diagram illustrating an example computing system.

FIG. 5 is a computer architecture diagram showing an illustrative computer hardware architecture for an example computing system capable of implementing at least some embodiments presented herein. FIG. 5 includes a computer 500, including a processor 510, memory 520 and one or more drives 530. The computer 500 may be implemented as a conventional computer system, an embedded control computer, a laptop, or a server computer, a mobile device, a set-top box, a kiosk, a vehicular information system, a mobile telephone, a customized machine, or other hardware platform.

The drives 530 and their associated computer storage media, provide storage of computer readable instructions, data structures, program modules and other data for the computer 500. The drives 530 can include an operating system 540, application programs 550, program modules 560, and a database 580. The program modules 560 may include the interface design tool 100. The interface design tool 100 may be adapted to execute the process 400 for reshaping a graphical user interface as described in greater detail above with reference to FIG. 4. The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 510 through a user input interface that is coupled to a system bus, but may be coupled by other interface and bus structures, such as a parallel port, game port or a universal serial bus ("USB"). Computers such as the computer 500 may also include other peripheral output devices such as speakers, which may be coupled through an output peripheral interface 594 or the like.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

When used in a LAN or WLAN networking environment, the computer 500 may be coupled to the LAN through the network interface 596 or an adapter. When used in a WAN networking environment, the computer 500 typically includes a modem or other means for establishing communications over the WAN, such as the Internet or the network 508. The WAN may include the Internet, the illustrated network 508, various other networks, or any combination thereof. It will be appreciated that other mechanisms of establishing a communications link, ring, mesh, bus, cloud, or network between the computers may be used.

According to some embodiments, the computer 500 may be coupled to a networking environment. The computer 500 may include one or more instances of a physical computer-readable storage medium or media associated with the drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine. Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine. The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor memory 520 when the software is encoded therein. For example, the software may transform the state of transistors, capacitors, or other discrete circuit elements constituting the semiconductor memory 520.

As another example, the storage media may be implemented using magnetic or optical technology such as drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
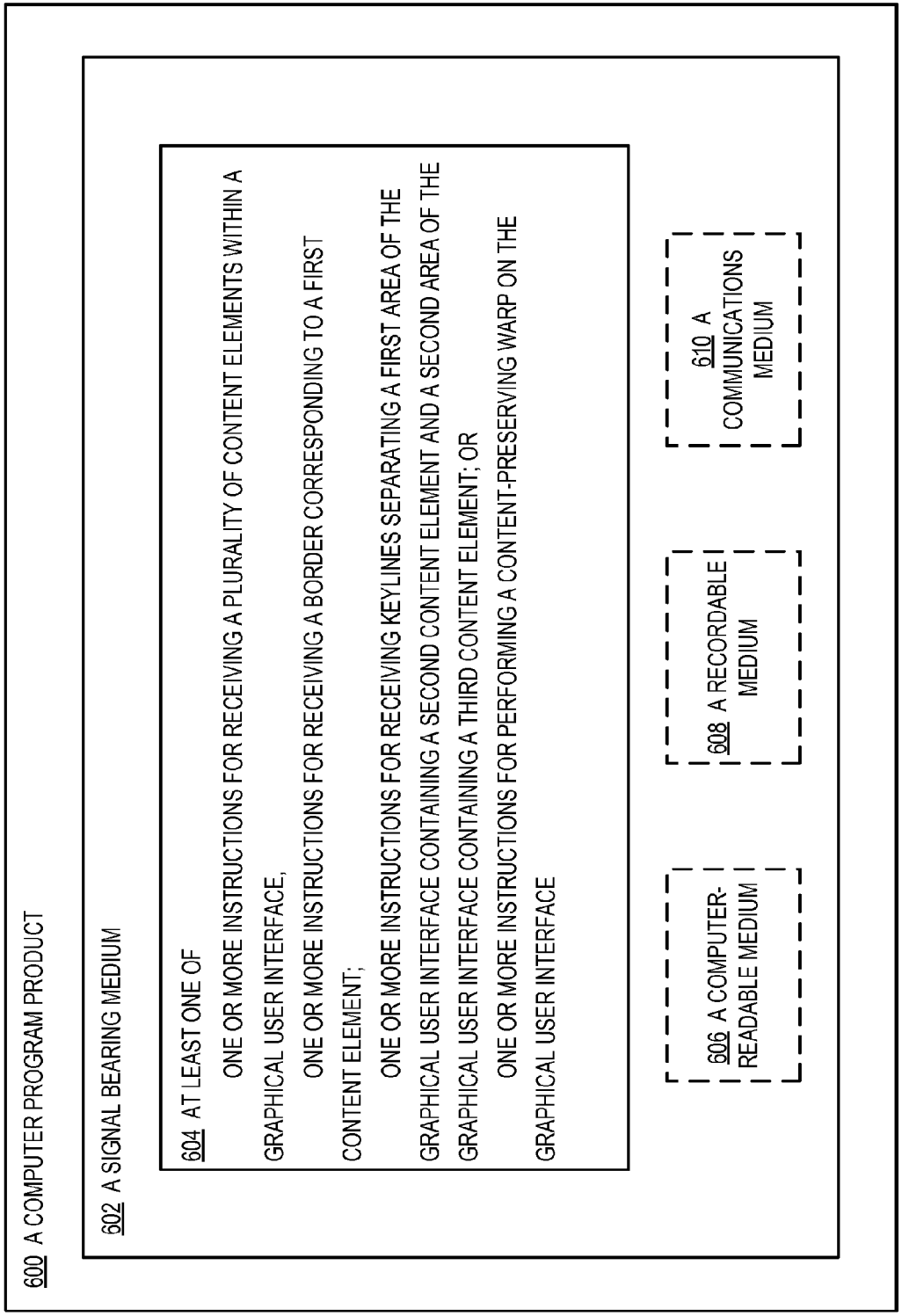
FIG. 6 is a schematic diagram illustrating a computer program product; all arranged according to at least some embodiments presented herein.

Turning now to FIG. 6, a schematic diagram that illustrates a partial view of a computer program product 600 that includes a computer program for executing a computer process on a computing device, arranged according to at least some embodiments presented herein. An illustrative embodiment of the example computer program product is provided using a signal bearing medium 602, and may include at least one instruction of 604: one or more instructions for receiving a one or more content elements within the graphical user interface; one or more instructions for receiving a border corresponding to the first content element; one or more instructions for receiving keylines separating a first area of the graphical user interface containing a second content element and a second area of the graphical user interface containing a third content element; and one or more instructions for performing a content-preserving warp on the graphical user interface. In some embodiments, the signal bearing medium 602 of the one or more computer program products 600 include a computer readable medium 606, a recordable medium 608, and/or a communications medium 610.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than,"

"less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for reshaping or resizing a graphical user interface, the method comprising:
   receiving, through a computer having a processor and a memory, an input of three or more content elements within the graphical user interface, wherein receiving the input of the three or more content elements within the graphical user interface comprises:
   providing, through the computer, three or more unselected content elements; and
   receiving, through the computer, the input of the three or more content elements selected from the three or more unselected content elements;
   receiving, through the computer, a border corresponding to a first content element in the three or more content elements, wherein the border is configured to preserve the shape and dimensions of the first content element after reshaping or resizing the graphical user interface;
   receiving, through the computer, two or more keylines that define a first area of the graphical user interface containing the first content element, a second area of the graphical user interface containing a second content element, and a third area of the graphical user interface containing a third content element;
   after receiving the border and the two or more keylines, reshaping or resizing the graphical user interface, by the computer, such that:
   a shape and dimensions of the first content element corresponding to the border are preserved;
   a position of the first content element adjusts within the first area based on the reshape of the first area of the graphical user interface,
   a shape of the second content element adjusts within the second area based on the reshape of the second area of the graphical user interface, and
   a shape of the third content element within the third area is preserved.

2. The computer-implemented method of claim 1, wherein receiving the border corresponding to the first content element in the three or more content elements comprises:
   providing, through the computer, the three or more content elements in a design tool, wherein the design tool comprises an input function for use in defining the border; and
   receiving, through the computer, the border via the input function in the design tool.

3. The computer-implemented method of claim 2, wherein the input function is configured to effectuate the defining of the border by marking the first content element in the design tool.

4. The computer-implemented method of claim 3, wherein providing the three or more content elements in the design tool comprises displaying, through the computer, the three or more content elements in the design tool; and
   wherein receiving the border via the input function in the design tool comprises receiving, through the computer, the marking of a continuous line on an outer edge of the first content element defining the border.

5. The computer-implemented method of claim 3, wherein the marking is visible when the graphical user interface is displayed via the design tool and non-visible when the graphical user interface is displayed apart from the design tool.

6. The computer-implemented method of claim 2, wherein the input function is configured to receive a plurality of coordinates around the first content element, the plurality of coordinates being effective to define the border.

7. The computer-implemented method of claim 6, wherein receiving the border via the input function in the design tool comprises receiving, through the computer, the plurality of coordinates on an outer edge of the first content element and an indication that the plurality of coordinates form a complete geometry defining the border.

8. The computer-implemented method of claim 1, wherein receiving the two or more keylines comprises:
   providing, through the computer, the three or more content elements in a design tool, wherein the design tool comprises an input function for defining the two or more keylines; and
   receiving, through the computer, the two or more keylines via the input function in the design tool.

9. The computer-implemented method of claim 8, wherein the input function is configured to effectuate the defining of the two or more keylines by marking two or more lines delineating at least one of the first area, the second area, and the third area.

10. The computer-implemented method of claim 9, wherein providing the three or more content elements in a design tool comprises displaying, through the computer, the three or more content elements in the design tool; and
    wherein receiving the two or more keylines via the input function in the design tool comprises receiving, through the computer, the marking of two or more lines delineating at least one of the first area, the second area, and the third area.

11. The computer-implemented method of claim 1, wherein the three or more content elements comprise graphical elements and textual elements.

12. The computer-implemented method of claim 1, further comprising reshaping or resizing the graphical user interface to conform the graphical user interface to a non-rectangular surface; and
    displaying the graphical user interface on the non-rectangular surface.

13. A computer system, comprising:
    a processor; and
    a memory configured to be in communication with the processor;
    the processor effective to:
    provide three or more unselected content elements;
    receive three or more content elements selected from the three or more unselected content elements;
    receive the three or more content elements within a graphical user interface, wherein the three or more content elements include a first content element, a second content element, and a third content element;
    receive a border corresponding to the first content element, wherein the border is configured to preserve the shape and dimensions of the first content element after the graphical user interface is reshaped or resized;

receive two or more keylines, that define a first area of the graphical user interface containing the first content element, a second area of the graphical user interface containing the second content element, and a third area of the graphical user interface containing the third content element; and after receipt of the border and the two or more keylines, reshape or resize the graphical user interface, such that:

a shape and dimensions of the first content element corresponding to the border are preserved, a position of the first content element adjusts within the first area based on the reshape of the first area of the graphical user interface, a shape of the second content element adjusts within the second area based on the reshape of the second area of graphical user interface, and a shape of the third content element within the third area is preserved.

14. The computer system of claim 13, wherein the processor is further effective to:

provide a first input function effective to define the border; and receive the border via the first input function.

15. The computer system of claim 14, wherein the first input function is configured to receive a marking of a continuous line on an outer edge of the first content element to define the border.

16. The computer system of claim 15, wherein the continuous line is visible when the graphical user interface is displayed via the design tool and non-visible when the graphical user interface is displayed apart from the design tool.

17. The computer system of claim 14, wherein the first input function is configured to receive a plurality of coordinates on an outer edge of the first content element and an indication that the plurality of coordinates form a complete geometry effective to define the border.

18. The computer system of claim 14, wherein the processor is further effective to:

provide a second input function effective to define the two or more keylines in the three or more content elements; and receive the two or more keylines via the second input function.

19. The computer system of claim 18, wherein the second input function is configured to receive a marking of two or more lines delineating the first area, the second area, and the third area, the two or more lines effective to define the two or more keylines.

20. The computer system of claim 13, wherein the three or more content elements comprise graphical elements and textual elements.

21. The computer system of claim 13, wherein reshaping or resizing includes reshaping or resizing the graphical user interface to conform the graphical user interface to a non-rectangular surface through an augmented reality device.

22. A non-transitory computer-readable storage medium having computer-executable instructions stored thereon which, when executed by a computer, cause the computer to:

provide three or more unselected content elements;

receive three or more content elements selected from the three or more unselected content elements;

receive the three or more content elements within a graphical user interface, wherein the three or more content elements comprising include a first content element, a second content element, and a third content element;

receive a border corresponding to the first content element, wherein the border is configured to preserve the shape and dimensions of the first content element after the graphical user interface is reshaped or resized;

receive two or more keylines that define a first area of the graphical user interface containing the first content element, a second area of the graphical user interface containing the second content element, and a third area of the graphical user interface containing the third content element; and after the border and the two or more keylines are received, reshape or resize the graphical user interface to conform the graphical user interface to a non-rectangular surface, such that:

a shape and dimensions of the first content element corresponding to the border are preserved, a position of the first content element adjusts within the first area based on the reshape of the first area of the graphical user interface, a shape of the second content element adjusts within the second area based on the reshape of the second area of graphical user interface, and a shape of the third content element within the third area is preserved; and display the graphical user interface on the non-rectangular surface.

* * * * *

UNITED STATES PATENT AND TRADEMARK OFFICE
CERTIFICATE OF CORRECTION

PATENT NO. : 8,887,073 B2  Page 1 of 1
APPLICATION NO. : 13/059826
DATED : November 11, 2014
INVENTOR(S) : Kruglick It is certified that error appears in the above-identified patent and that said Letters Patent is hereby corrected as shown below:

In the Specification

In Column 1, lines 3-4 below Title, insert -- CROSS-REFERENCE TO RELATED APPLICATIONS
The present application is a U.S. national stage filing under 35 U.S.C. §371 of International Application No. PCT/US2010/058503, filed on Dec. 1, 2010. --.

Signed and Sealed this
Nineteenth Day of May, 2015

Michelle K. Lee
*Director of the United States Patent and Trademark Office*